Nov. 11, 1958  W. TELLMANN  2,860,257
DEVICE FOR BALANCING INDUCTION FURNACE PHASE CURRENTS
Filed Oct. 14, 1957
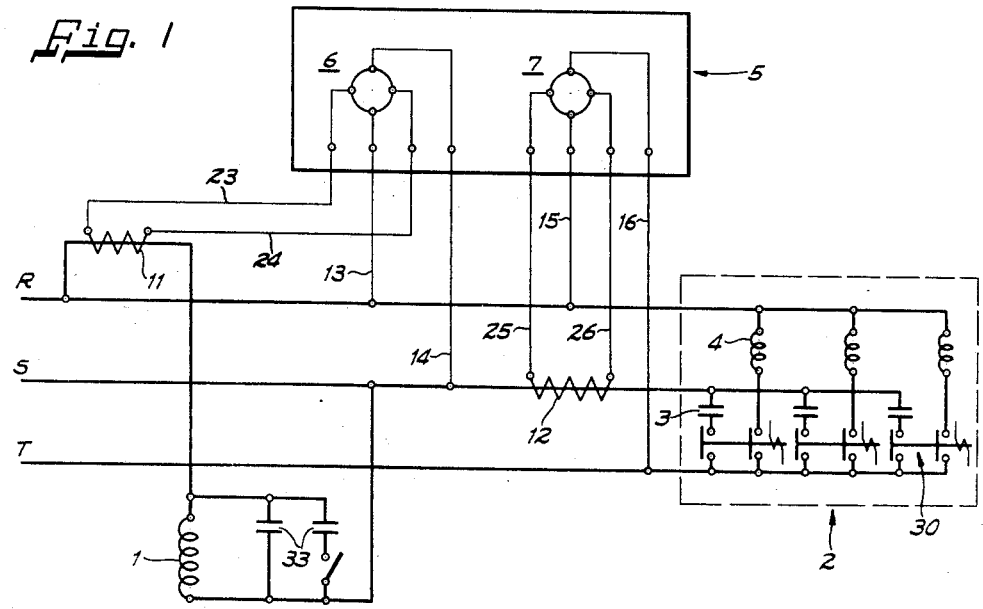
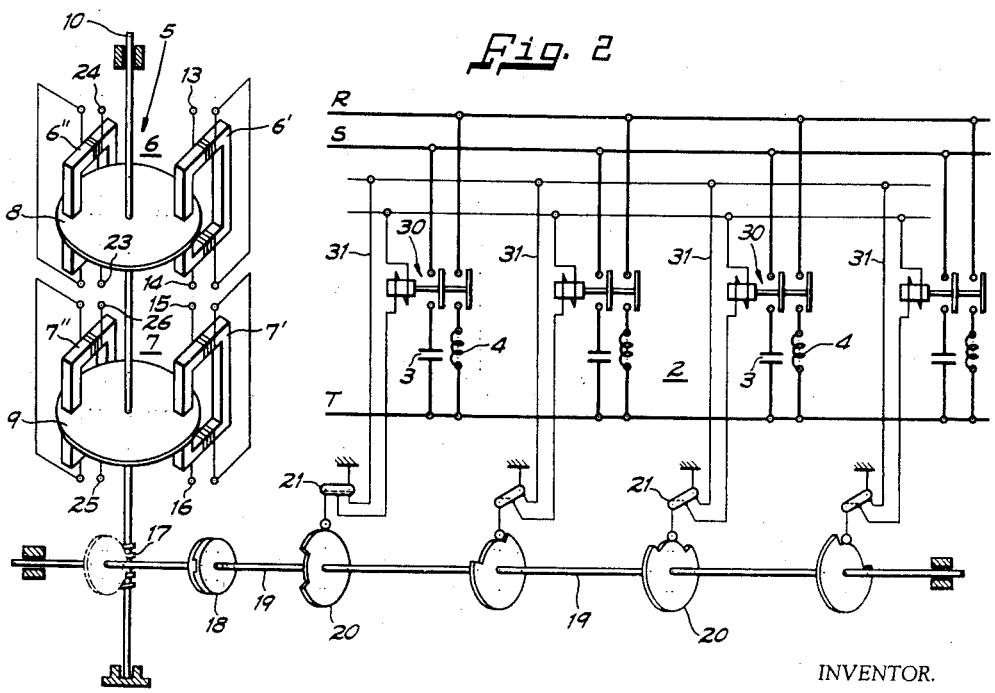
INVENTOR.
*Werner Tellman*
BY
*Ralph G. Hohenfeldt*
*Attorney*

United States Patent Office 2,860,257
Patented Nov. 11, 1958

2,860,257
DEVICE FOR BALANCING INDUCTION FURNACE PHASE CURRENTS

Werner Tellmann, Duisburg, Germany, assignor to Demag-Elektrometallurgie G. m. b. H., Duisburg, Germany, a corporation of Germany Application October 14, 1957, Serial No. 689,957

Claims priority, application Germany October 15, 1956

4 Claims. (Cl. 307—14)

This invention relates generally to crucible type induction furnaces and in particular to a regulating arrangement for automatically equalizing the electric loading in each phase of the furnace power supply system.

Induction crucible furnaces which are working at power frequency are connected normally in such a way to a three-phase alternating circuit that the furnace coil is between two phases of the three-phase alternating circuit. In order to arrive at an equal loading of all three phases of the system, one uses a balancing device which consists of capacitors and chokes. These capacitors and chokes are connected in delta between the other phases of the three-phase alternating circuit, and with proper adjustment it is possible to arrive at an equal system loading.

For well known reasons it is necessary to tune the furnace coil, by means of a capacitor bank, as close as possible to the power factor 1. With this, the size of the necessary balancing device is determined at the same time. The capacitors and chokes of the balancing device must have a reactive power of 0.577 time the active power of the furnace coil whose power factor is adjusted to unity. Therefore, if the furnace coil has, for example, a power of 1000 kw., the balancing device must receive a power of 577 kw. In order to obtain the proper tuning for each loading, the furnace capacitor bank as well as the balancing device are arranged in such a way that they can be changed in magnitude. Usually taps with respective switches are used for this purpose, which are switched by hand under observation of the measuring instruments on the panel.

Also, it is already known how to regulate automatically the furnace coil capacitors as well as the balancing device. For this purpose, the furnace circuit, for instance, is regulated through the use of current transformers and reactive power limiters by comparing the current of the furnace coil with the current of the respective capacitors, and the balancing device is regulated by comparing the furnace current with the current of the balancing device by means of rectifiers, amplifiers and regulators.

Service experience indicates that through the use of rectifiers with respective amplifiers and regulators for tuning of the balancing device to a desired nominal value, hunting develops, making proper regulation more difficult. The causes of this disturbance lie in the regulators, because these, due to their high sensitivity, are operating without delay for each deviation from the nominal value. In order to suppress this hunting, it is known to employ time delay relays between rectifier and regulator or between regulator and adjusting device for the connection or disconnection of the capacitors and chokes, in which manner certain advancement or delay times can be adjusted. However, as the loading of the furnace coil changes within broad limits during service, only a certain average value can be adjusted on the time delay relay as advancement or delay time, if one would like to avoid a repeated adjustment of the time delay relay. In addition, it must be considered that the investment for such regulating devices is undesirably high.

In order to avoid these disadvantages and to obtain a fully automatic and unobjectionable regulation for each loading of the furnace, at low initial cost, the invention has as one of its objects the employment of a regulator for the regulation of the desired current ratio between the furnace and balancing circuit, which regulator is equipped with two Ferraris systems, connected in counter-electromotive sense, the discs of which are arranged on a common shaft.

A more specific object of the invention is to equalize loading of the phases in an induction furnace electric supply without resort to expensive and even delicate rectifiers, amplifiers, and regulators and to replace such prior art apparatus with a balancing scheme that is simple, inexpensive and inherently anti-hunting.

A general object of the invention is to provide a new and improved induction furnace control. Other more specific objects will be evident when proceeding through the specification.

The method of operation of this regulating and balancing arrangement is explained in greater detail in connection with the example represented in the drawing in which:

Fig. 1 is a schematic circuit diagram; and,

Fig. 2 shows the details of the regulator, according to the invention, as well as the balancing device.

In Fig. 1, the alternating current power mains R, S and T are shown to supply the regulating circuits and an induction furnace coil 1. The power mains are supplied from a tap changing power transformer, not shown. Tuning capacitors 33, in parallel with the furnace coil 1, may be selectively connected and disconnected from the circuit by automatic means, not shown, but well known in the art. Reactive power limiters for tuning are also not represented.

In order to arrive at an equal loading of all three phases R, S, T of the three-phase alternating circuit, a balancing device 2 is used which conventionally consists in groups of capacitors 3 and chokes 4. The capacitor group is connected across phases S and T, and the choke group across phases R and S so that coil 1, reactors or chokes 4, and capacitors 3 constitute a delta connected load on the mains R, S, T.

A tendency for the phase loads to become unbalanced is detected in a sensing device or regulator, generally designated 5. In accordance with the invention, regulator 5 comprises two Ferraris systems, 6 and 7 generally, adapted to impart equal counter torques to a common shaft 10 under balanced conditions. The Ferraris systems are comparable, the first includes a current coil 6″ and a voltage coil 6′ each of which has an associated iron core and an air gap which an induction disc 8 crosses transversely. The other includes a current coil 7″, voltage coil 7′ and a disc 9.

The current coil 6″, of regulator 5, is supplied through wires 23 and 24 from the secondary of current transformer 11 whose primary is in the furnace coil circuit. Voltage coil 6′ is energized from phase R and S across which the furnace coil 1 is also connected by wires 13 and 14. Thus, a torque is imparted to disc 8 when these coils are energized.

The current coil 7″ is supplied through wires 25, 26 from the secondary of current transformers 12 whose primary is in phase S and leads to one common delta point for balancing chokes 4 and capacitors 3. Voltage coil 7′ is energized and connected across phases R and T through wires 15 and 16. An opposite and equal counter torque is imparted to disc 9 when these coils are energized under normal conditions. The arrangement operates as follows:

As previously mentioned, the power in the balancing circuit must always amount to 0.577 times the power in the furnace circuit. The furnace circuit shall be tuned automatically to the power factor 1 and must therefore not be considered at this time. The tuning of the balancing circuit to the nominal value is done through comparison of the kva-values in furnace circuit and balancing circuit. For this purpose, according to the invention, regulator 5 is used, of which system 6 is influenced by current and voltage of the furnace coil while system 7 is under the influence of the current and the voltage in the balancing circuit. Systems 6 and 7 are adjusted in such a manner that at proper tuning of furnace and balancing circuit, shaft 10 remains immobile.

As one can easily see from Fig. 2, each current change in the balancing circuit causes a rotary motion of shaft 10 because through the current change, the equilibrium of the torsional moments of the two discs 8 and 9 effected by the systems 6 and 7 is being disturbed. Through each rotary motion of shaft 10 which is connected with cam shaft 19 through worm gear and wheel drive 17 and clutch 18, the mercury switches 21 are actuated through cams 20 and in such a way the capacitors 3 and chokes 4 of the balancing device are being connected or disconnected until the nominal value in the balancing circuit has been reached.

The steps of capacitance 3 and reactance 4 of the balancing circuit are connected to their phase wires by a plurality of relays 30 that are energized in sequence over wires 31 in accordance with the rotational positions of cams 20.

It is claimed:

1. An arrangement for obtaining equal currents in a three phase alternating circuit that supplies an induction furnace or the like, comprising a furnace circuit including an induction coil whose power factor may be adjusted to approximately 1.0 under operating conditions, a balancing circuit including capacitors and chokes connected in delta with said coil, said balancing circuit being adapted for adjustment of its power factor to 0.577 in accordance with the magnitude of the kva. values in the furnace circuit, and two Ferraris systems including a common shaft having induction discs thereon, said Ferraris systems each including current and voltage coils inductively associated with respective discs which coils are respectively responsive to the current and voltage of the furnace circuit and balancing circuit, whereby equal counter torques are imparted to the discs under balanced conditions, and switch means operable in response to rotation of the discs during unbalanced conditions to connect or disconnect capacitors and chokes in the balancing circuit until the ratio of the furnace circuit power factor to that of the balancing circuit is restored to approximately 1.0 to 0.577.

2. The invention according to claim 1 including a plurality of cam means in different angular relations with each other and connected for joint rotation, means coupling said cam means with said common disc shaft for alternate rotation therewith, said cam means being operatively connected with said switch means.

3. A regulator for an induction furnace having an induction coil connected across one phase of a polyphase alternating system, said regulator comprising two Ferraris systems adapted to compare the kva. values in the one phase with the values in the other phases, said Ferraris systems each including an induction disc and a current and a voltage coil inductively associated therewith, a common shaft for said discs upon which said Ferraris systems impart opposite and equal torques under balanced conditions, current and voltage coils of one system being supplied from the induction coil phase and the same coils in the other system being supplied from the other phases respectively, whereby unbalanced conditions between the phases imparts a net torque to the common shaft for rotating it in one or the other directions.

4. Regulating means for equalizing current in the power lines for an induction furnace coil in a furnace load circuit whose power factor may be adjusted to 1.0 and that is connected to one phase of a three phase system, first and second induction discs and a common shaft therefor, a current coil associated with each disc, the current coil associated with the first disc being energized by current in a first line and the current coil associated with the other disc being energized by current in a second line, a voltage coil associated with each disc, the voltage coil associated with the first disc being connected to the first and second lines and the voltage coil associated with the second disc being connected to the first and third lines, the torque imparted to each disc by said coils being equal and opposite when the ratio of the induction coil power factor to the power factor of the other circuits equals a preferred ratio of approximately 1.0 to 0.577, and the net torque on the discs being unequal and tending to rotate the common shaft when the power factor ratio departs from the aforesaid ratio, and means responsive to the angular positions of said common shaft for restoring the system to the preferred ratio.

No references cited.